Figure 1:
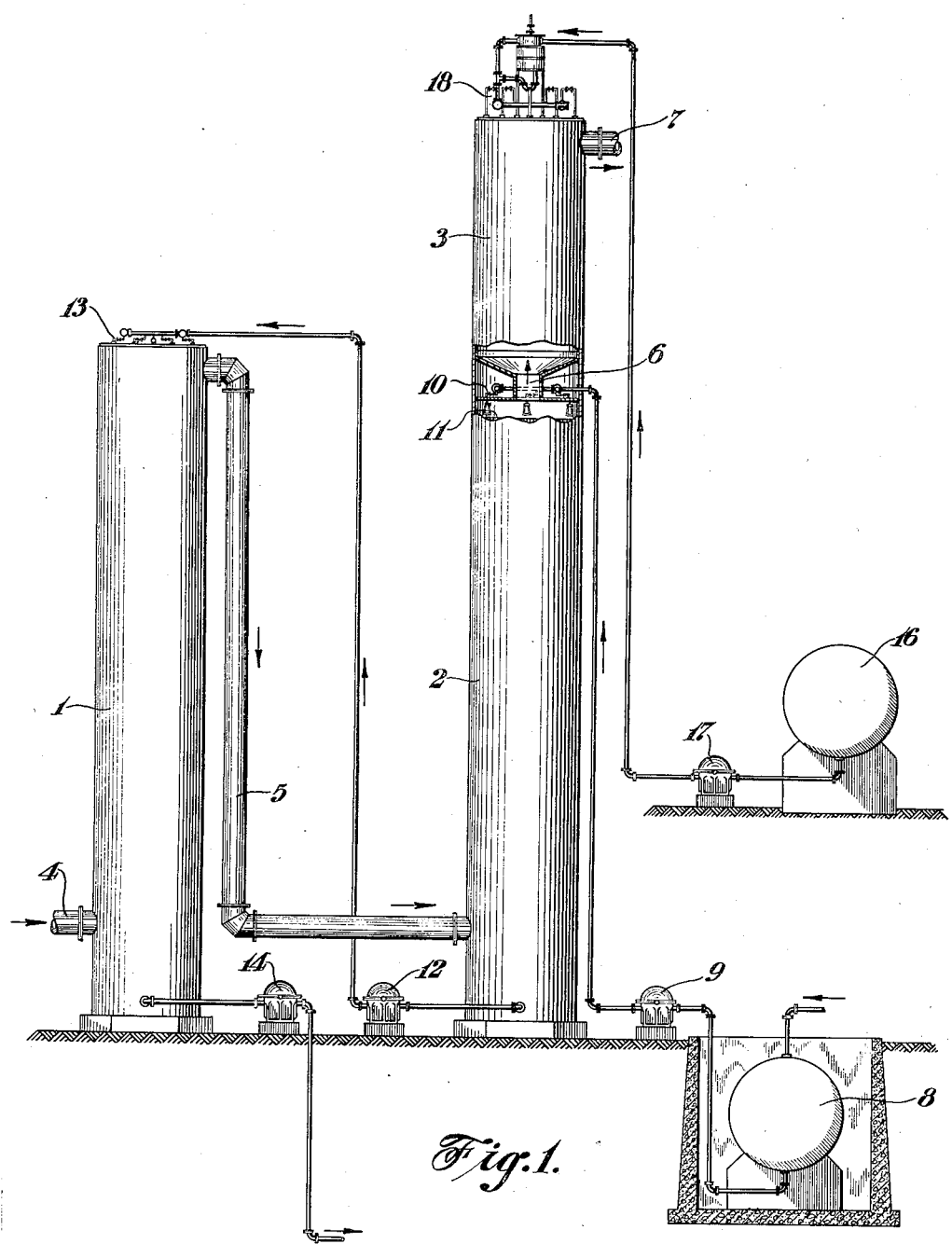

May 27, 1930. J. BECKER 1,760,335
PROCESS FOR THE REMOVAL OF BENZOL AND ITS HOMOLOGUES FROM FUEL GASES
Filed July 7, 1926 2 Sheets-Sheet 2

INVENTOR
Joseph Becker
BY
Jesse R. Langley
ATTORNEY

Patented May 27, 1930

1,760,335

UNITED STATES PATENT OFFICE

JOSEPH BECKER, OF PITTSBURGH, PENNSYLVANIA, ASSIGNOR TO THE KOPPERS COMPANY, A CORPORATION OF PENNSYLVANIA

PROCESS FOR THE REMOVAL OF BENZOL AND ITS HOMOLOGUES FROM FUEL GASES

Application filed July 7, 1926. Serial No. 120,895.

My invention relates to a process for the removal of benzol and its homologues and structurally related compounds from fuel gases, such as coal gas, water gas, coke oven gas and similar gases.

It is an object of the present invention to provide a process of the character described that shall remove benzol and structurally related compounds from gases to a greater degree than has been possible heretofore and without increasing the amount of solvent therefor.

It is a further object of my invention to provide a process for removing benzol from fuel gases that shall also effect the complete removal of naphthalene and of cumaron, indene and similar products.

These substances as well as toluol and xylol, which are the principal homologues of benzol above referred to, are structurally related to benzene, and together with benzene itself are known as benzenoid compounds and are included in that term as employed herein.

For many years, it has been the practice to remove benzol from fuel gases by passing the gas through one or two scrubbing towers. In case two towers were used, the gas passed through two stages in separate towers. A suitable solvent, such, for example, as wash oil, was introduced at the top of the second tower, collected at the bottom of the tower and then recirculated through the first tower, the oil and the gas passing through the system in opposite directions in accordance with well-known practice.

The enriched oil was then withdrawn to the wash oil stills for removal of the benzol content. Debenzolized oil was returned to the recirculating tank at the same rate at which it was withdrawn. Fresh oil or "make-up" oil was also added to the recirculating tank to compensate for any mechanical losses of wash oil. The effect of the addition of the "make-up" oil was to maintain the quantity of solvent substantially constant and to somewhat dilute the contaminated oil in the recirculating tank before it passed through the scrubbing towers.

While the addition of fresh oil slightly increased the absorptive qualities of the solvent, it did not materially contribute to the removal of benzol in the second tower where removal is the more difficult by reason of the relatively small percentage of benzol remaining in the great volume of gas. Since the oil is contaminated to a greater or less degree upon its introduction to the second tower, complete removal of the benzols, including xylol and toluol, has not been possible without either the use of excessive quantities of solvent or more complete distillation of the circulated solvent. Both of these solutions of the difficulty prevent economical operation of the plant.

The process described above has the further disadvantages that naphthalene, cumaron, indene and similar resins or gums are not completely removed. While these materials may be present in relatively small percentages, they are objectionable. The detrimental effects of naphthalene, for example, are cumulative and a small fraction of 1% of it in gas may cause deposits that seriously affect the operation of a system.

In accordance with my present invention, instead of adding the "make-up" oil to the main circulating system, I provide that this make-up oil is used for a final scrubbing of the gas before it joins the main circulating system. In this way, the pure uncontaminated oil is used for treatment of the gas containing the last residues of benzol, naphthalene, etc. that have escaped absorption in the first stages; and the removal of these is efficiently accomplished.

I may circulate as a solvent a partially contaminated petroleum oil known as "straw oil", which is the first cut above kerosene. In the first stages of the process, the purity of the solvent is such as to reduce the amounts of benzol, naphthalene, cumaron, indene and the like to such relatively small percentages that they may be readily absorbed by the fresh uncontaminated solvent in the final stage.

The fresh solvent flows downwardly into the second tower and mingles with the partially contaminated solvent supplied thereto, whereby it may be used in the earlier stages and thus augment the supply for such purposes.

It has been found that the total quantity of solvent required in accordance with my improved process wherein benzol, naphthalene, cumaron, indene and similar products are completely removed is no greater than the quantity necessitated by the processes of the prior art wherein complete removal of the products named above was not possible.

Figure 2:
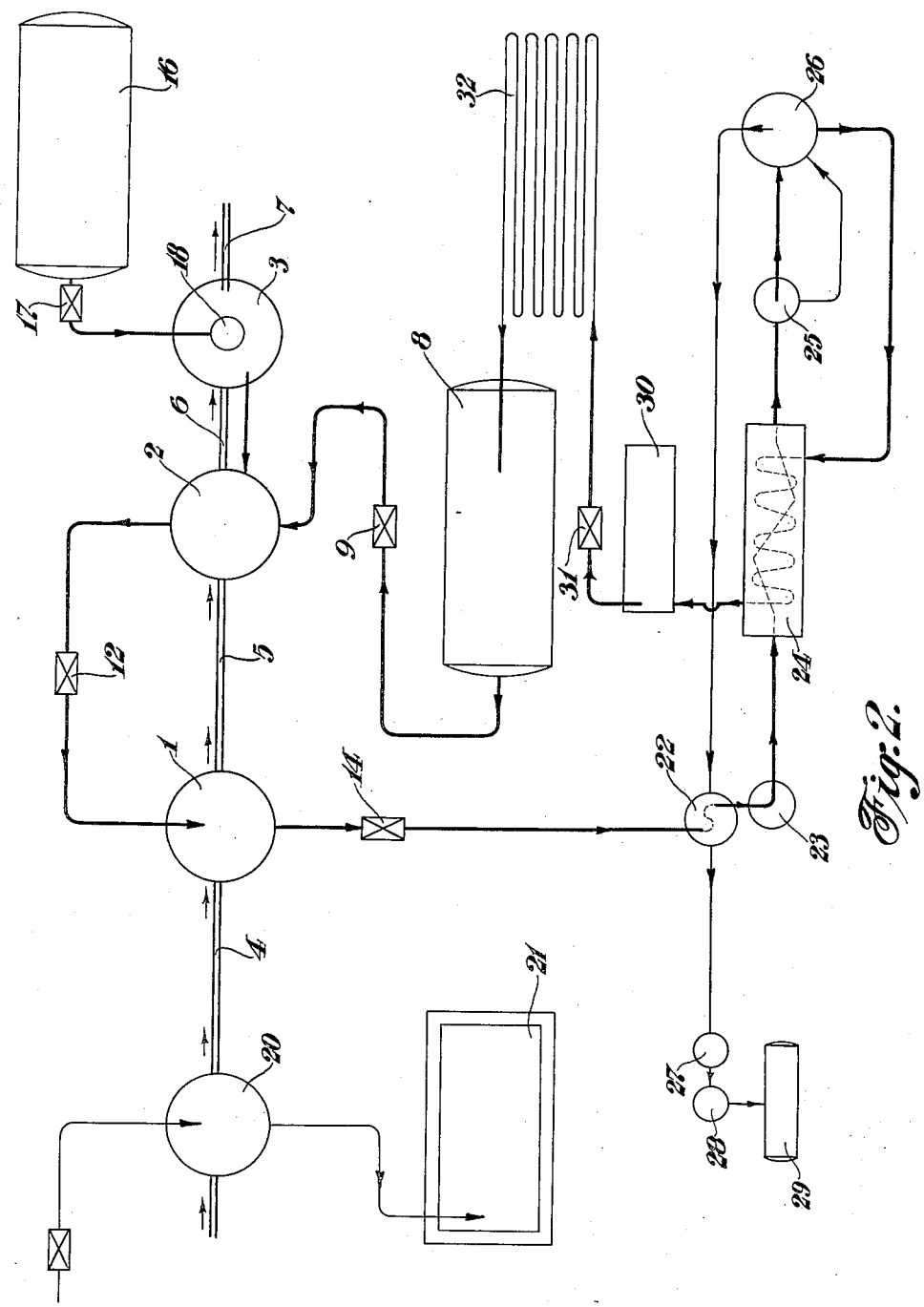

My invention will be explained and described in connection with the accompanying drawings, in which Figure 1 is an elevational view of apparatus embodying my invention, certain of the parts being shown diagrammatically; and Fig. 2 is a diagrammatic view of apparatus for practicing the process of my invention.

Referring particularly to Fig. 1, towers 1, 2 and 3 are provided for the scrubbing of fuel gas in successive stages. Towers 2 and 3 are functionally independent but structurally they are conveniently combined, with the tower 3 superposed on the tower 2. The fuel gas to be treated enters the tower 1 through a pipe 4 and, after passing through the tower 1, passes through a pipe 5 to the tower 2. A duct 6 connects the towers 2 and 3 and an outlet pipe 7 conducts the gas to any suitable storage means.

The solvent for the benzol content of the gas, which may be, for example, straw oil or the like, is stored in a tank 8, from which it is circulated through tower 2 by means of a pump 9, which supplies the solvent to a spraying device 10 at the top of tower 2, permitting the solvent to flow downwardly over a series of hurdles 11, or other suitable structure for providing a relatively large surface area for contact with the gas.

The interior of the several towers may comprise a series of hurdles 11, only certain of which are shown, between which are interposed layers of steel turnings or the like, such as are shown and described, for example, in the patent to Sperr, No. 1,578,687. The details of this structure are not illustrated, since they constitute no part of the present invention.

A pump 12 removes the solvent as it collects at the bottom of tower 2 and supplies it to a spraying device 13, at the top of tower 1. A pump 14 removes the enriched solvent from the bottom of tower 1 and supplies it to the system for removing benzol and other products therefrom, as will be later described.

A tank 16 is provided with a supply of fresh uncontaminated straw oil or solvent that is supplied by a pump 17 to an intermittent spray device 18 of any suitable type, which may be, for example, that shown and described in the copending application of Alfred R. Powell, Serial No. 84,640, and which operates to spray fresh oil periodically at the top of the tower 3.

The operation of the apparatus of Fig. 1 will be described in connection with the diagram of Fig. 2, in which the course of the gas and the solvent are indicated by arrows, similar reference numerals being employed to designate corresponding parts. The gas, which may be supplied from any convenient source, is first passed through a cooling tower 20 wherein it comes in contact with water, which not only reduces its temperature but removes a certain portion of the naphthalene therefrom. The cooling water passes from the tower into a sump 21. The gas then passes through the pipe 4 into tower 1, where it comes in contact with the partially enriched solvent from tower 2. In view of the relatively high percentage of benzol in the gas in tower 1, a considerable portion of the benzol is removed.

The gas then traverses pipe 5 to tower 2, where it comes in contact with the solvent that has been debenzolized and is, therefore, only partially contaminated. It is necessary that, in the second stage of the process, the solvent have greater absorptive qualities than in the first stage, because the percentage of benzol in the gas is now materially lower and is correspondingly difficult to remove. The gas, upon leaving the tower 2, still retains a small percentage of benzol, together with certain amounts of naphthalene, cumaron and indene, which are not removed by the debenzolized oil.

When the gas passes through the duct 6 into tower 3, it comes in contact with fresh uncontaminated solvent that is highly absorptive. The fresh solvent completely removes the small percentage of benzol remaining in the gas and also completely removes naphthalene, cumaron, indene and the like from the gas. The result is that the gas, upon entering the outlet pipe 7, is free from benzol and from such undesirable substances as naphthalene, cumaron, indene and similar resins and gum-forming materials.

The cycle of the debenzolized oil through towers 2 and 1 and the removal of the benzol therefrom will now be described. As stated above, the solvent is removed from the tank 8 by pump 9, after which it passes successively downwardly through the tower 2 to the pump 12 and downwardly through the tower 1, after which the pump 14 transfers it to a heat exchanger 22, wherein the enriched solvent is heated by vapors from a still, referred to hereinafter.

The oil next passes to a decanter 23 and then through an oil-to-oil heat exchanger 24 and a pre-heater 25, that may be heated by steam, to an oil still 26 which may be operated by live steam in a well-known manner. The benzol vapors from the oil still pass through the vapor-to-oil heat exchanger 22, a condenser 27 and a decanter 28 to a collecting tank 29. The debenzolized oil passes from the oil still 26 through the oil-to-oil heat exchanger 24, a hot drain tank 30, a pump 31 and a suitable cooling device 32, back to the debenzolized oil tank 8 in readiness for subsequent circulation through the towers and other apparatus in the order and the manner just described.

The fresh oil from the tower 3 with its relatively low content of benzol and other materials referred to above flows downwardly in tower 2 and becomes a part of the oil that circulates through towers 1 and 2. The addition of oil from this source is sufficient to maintain the necessary quantity without other additions thereto and to render it unnecessary to add "make-up" oil. For example, it has been found that in a typical installation of the prior art, a total of 10 to 20 gallons of make-up oil per million cu. ft. of gas were required to be added to the debenzolized oil to compensate for mechanical losses, but this process did not completely remove the benzol including xylol and toluol, and, in addition, cumaron, indene, etc., were not removed. I have found that the same quantity of oil when employed in accordance with my invention will effect the complete removal of these products and that the only additional oil required to maintain a constant supply is that supplied to the tower 3.

The advantages of my improved process will be apparent from the description of its operation. A greater quantity of benzol is recovered with the same quantity of solvent per unit of gas to be treated. Naphthalene is completely removed from the gas as are cumaron, indene, etc. Accordingly, the result is not only to purify the gas to a higher degree but to secure a greater quantity of benzol without in any way increasing the cost of operation of the plant.

I claim as my invention:

1. The process of removing benzenoid compounds from fuel gas which comprises passing the gas through successive stages, introducing a solvent at an intermediate stage, recirculating said solvent at an earlier stage, removing at least a portion of the benzenoid compounds from the enriched solvent and returning the debenzolized solvent to the intermediate stage and then introducing fresh uncontaminated solvent at the final stage in the progress of the gas.

2. The process of removing benzenoid compounds from fuel gas which comprises passing the gas through three stages successively, introducing straw oil or similar solvent at the intermediate stage to remove the major portion of the benzol in the gas, recirculating the solvent at the first stage to initially reduce the benzol content of the gas, removing the major portion of the benzol from the enriched solvent and returning the debenzolized solvent for use at the intermediate stage and then introducing fresh uncontaminated solvent at the final stage to remove the remaining benzenoid compounds, the fresh solvent mingling with the debenzolized solvent at the intermediate stage.

3. The process of removing benzenoid compounds from fuel gas which comprises recirculating a relatively large quantity of absorbent oil over a stage in which it comes into contact with the gas and a stage in which it is distilled for removal of benzenoid compounds therefrom, and treating the gas subsequent to contact with said recirculating oil with a relatively small volume of unrecirculated fresh absorbent oil.

4. The process of removing benzenoid compounds from fuel gas which comprises recirculating a relatively large quantity of absorbent oil over a stage in which it comes into contact with the gas and a stage in which it is distilled for removal of benzenoid compounds therefrom, and treating the gas subsequent to contact with said recirculating oil with a relatively small volume of unrecirculated fresh absorbent oil, said fresh oil after contact with said gas being added to and refreshing said recirculated oil.

5. The process of removing benzenoid compounds from fuel gas which comprises recirculating a relatively large quantity of absorbent oil over a stage in which it comes into contact with the gas and a stage in which it is distilled for removal of benzenoid compounds therefrom, and replacing the losses of said recirculating oil by introducing fresh absorbent oil to the gas in a subsequent stage, allowing it to remain in contact with the gas a sufficient period to remove substantially all hydrocarbon oils not removed by said recirculating solvent, and then adding it to said recirculating oil.

6. The process of removing benzenoid compounds from fuel gas which comprises recirculating an absorbent oil over a stage in which it comes into contact with said gas and a stage in which it is treated for removal of benzenoid compounds therefrom, and treating the gas subsequent to contact with said recirculated oil with fresh absorbent oil, said fresh oil after contact with said gas being mingled with said recirculated oil.

7. The process of removing benzenoid compounds from fuel gas which comprises recirculating a relatively large quantity of absorbent oil over a stage in which it comes into contact with the gas and a stage in which it is treated for removal of benzenoid compounds therefrom, and treating the gas subsequent to contact with said recirculating oil with a relatively small volume of unrecirculated fresh absorbent oil, said fresh oil after contact with said gas being added to and refreshing said recirculated oil.

In testimony whereof, I have hereunto subscribed my name this 3rd day of July, 1926.

JOSEPH BECKER.